United States Patent [19]

Schrock et al.

[11] Patent Number: 4,803,553

[45] Date of Patent: Feb. 7, 1989

[54] VIDEO TIMING SYSTEM WHICH HAS SIGNAL DELAY COMPENSATION AND WHICH IS RESPONSIVE TO EXTERNAL SYNCHRONIZATION

[75] Inventors: Anthony W. Schrock, Rochester; David K. McCauley, Henrietta, both of N.Y.

[73] Assignee: Eastman Kodak Company, Rochester, N.Y.

[21] Appl. No.: 143,110

[22] Filed: Jan. 11, 1988

[51] Int. Cl.⁴ .............................................. H04N 5/04
[52] U.S. Cl. ...................... 358/149; 358/19; 358/320; 358/324; 358/337
[58] Field of Search ................ 358/19, 148, 149, 160, 358/320, 324, 337

[56] References Cited

U.S. PATENT DOCUMENTS 4,214,261 7/1980 Bazin et al. ........................ 358/19
4,298,889 11/1981 Burianek et al. .................. 358/149

Primary Examiner—James J. Groody
Assistant Examiner—Michael D. Parker
Attorney, Agent, or Firm—Robert H. Sproule

[57] ABSTRACT

A video timing system is provided for clocking an imaging sensor as well as for clocking a downstream video monitor and NTSC encoder. Due to signal processing delays between the sensor and the monitor/encoder, the first pixel is clocked out of the sensor prior to beginning the rasters of the monitor and encoders by a time period which is equal to the signal processing delay. In this manner, the first pixel out of the sensor is displayed at the beginning of the video rasters. In response to a video signal from an external source, the video monitor and NTSC timing is adjusted so as to be synchronous with the external source. Timing adjustment of the sensor is facilitated by the fact that the time period for early clocking of the sensor is unchanged whether or not the external video signal is present.

8 Claims, 12 Drawing Sheets

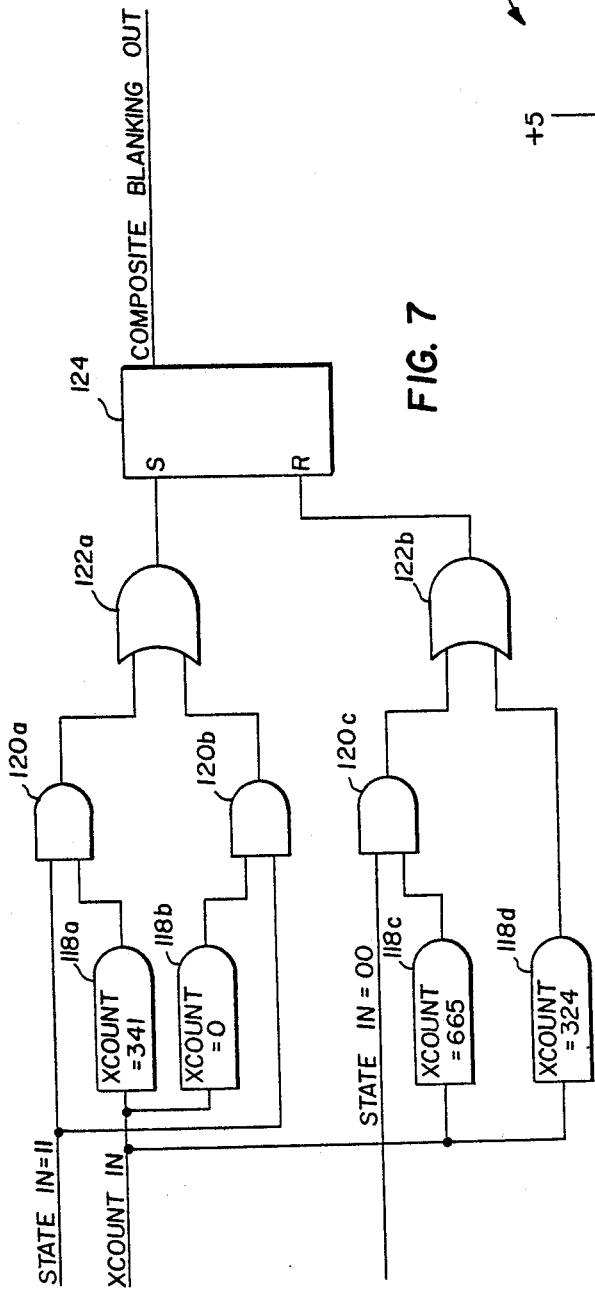
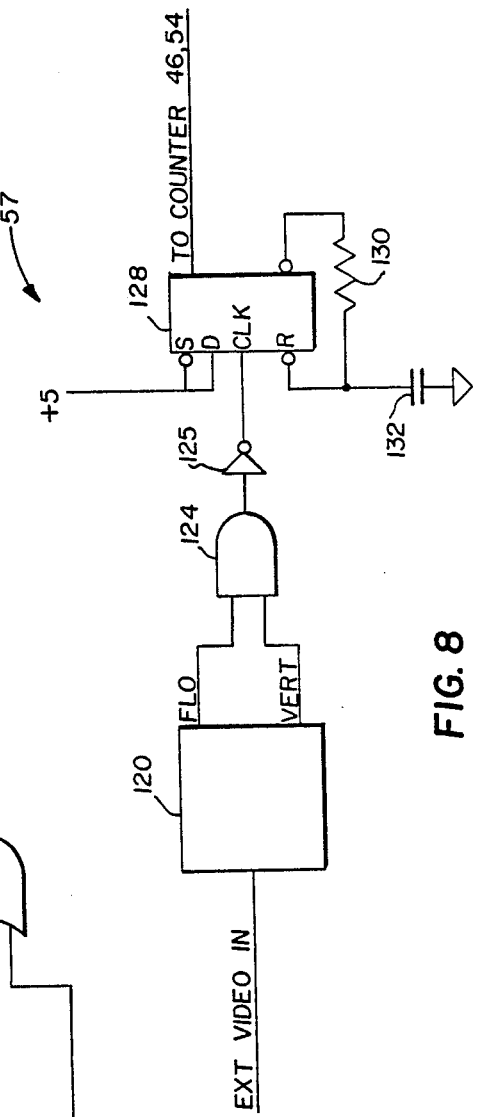
FIG. 7
FIG. 8

4,803,553

VIDEO TIMING SYSTEM WHICH HAS SIGNAL DELAY COMPENSATION AND WHICH IS RESPONSIVE TO EXTERNAL SYNCHRONIZATION

TECHNICAL FIELD

The present invention pertains to a video timing system for clocking a solid state imaging sensor (CCD) as well as a downstream color monitor and an NTSC encoder in a manner (i) to compensate for signal processing delays occurring between the sensor and monitor or encoder, and (ii) to be synchronous with an external video source.

BACKGROUND OF THE INVENTION

In a video system which utilizes a solid state sensor to generate image signals for color monitor and NTSC video applications, timing must be provided so that the first pixel to be displayed out of the imaging sensor is synchronized with the start of the first picture line of the color monitor raster or NTSC video raster. The timing is complicated by the fact that the signal out of the sensor is usually subject to downstream processing prior to reaching the monitor or NTSC encoder. This intermediate signal processing delays the signal from reaching the monitor and encoder, and must be compensated for by the system timing in order to achieve a proper video display.

In addition, it may also be desirable to synchronize (genlock) the video system to an external video source such as a separate video camera. This requires the synchronization of the sensor, monitor and encoder to the external video source, while maintaining the aforementioned delay compensation between the sensor and the monitor or encoder.

Conventionally a system for adjusting the timing of a video output from a camera or playback device so as to be synchronous with another video source is described in U.S. Pat. No. 3,984,633 by Rutt et al.

SUMMARY OF THE INVENTION

The present invention pertains to a video system which includes a solid state imager, intermediate signal processing, and a downstream monitor and/or NTSC encoder. To synchronize the sensor with the downstream monitor and encoder, the first pixel is clocked out of the sensor prior to the beginning of the monitor/NTSC encoder raster by a time period which is equal to the delay in the intermediate signal processing. This allows the first pixel out of the sensor to be displayed at the beginning of the video raster. During the presence of an external video signal, the video system may be locked to this external video signal so that they operate synchronously. This is accomplished by locking the monitor and NTSC encoder rasters to the external video raster. Since the pixels are clocked out of the sensor in relation to the monitor and NTSC encoder rasters, this timing relationship remains the same whether or not the system is locked to the external video signal.

More particularly, the present invention pertains to a video system which includes means, such as an imaging sensor, for outputting at a first time a first signal which begins with information representing a first element of an image. Also provided are means, such as a monitor, for receiving the first signal at a time which is later than the first time by a first time differential, and for generating an internal video signal for displaying the image by a raster. Also included are timing means having means for adjusting the internal video signal generating means so that the internal video signal begins the raster at a second time in response to receipt of the external video signal, and at a third time in response to nonreceipt of the external video signal. The timing means further includes means for adjusting the first signal outputting means in a manner to begin outputting the first element of the image ahead of the raster by a time which is equal to the time differential, so that the raster begins with the first element of the image when the raster starts at the second time and at the third time.

BRIEF DESCRIPTION OF THE DRAWINGS

These and other objects and advantages of the present invention will become more readily apparent upon reading the following detailed description in conjunction with the attached drawings, in which:

FIGS. 5A and 5B are diagrams of an exemplary circuit for generating binary states which identify the pulse groups making up the composite sync and composite blanking signals;

FIG. 7 is a diagram of an exemplary circuit for generating the composite blanking signal;

FIG. 8 is a circuit for generating a synchronizing signal in response to an external video source;

DETAILED DESCRIPTION OF THE INVENTION

Figures 1, 3:
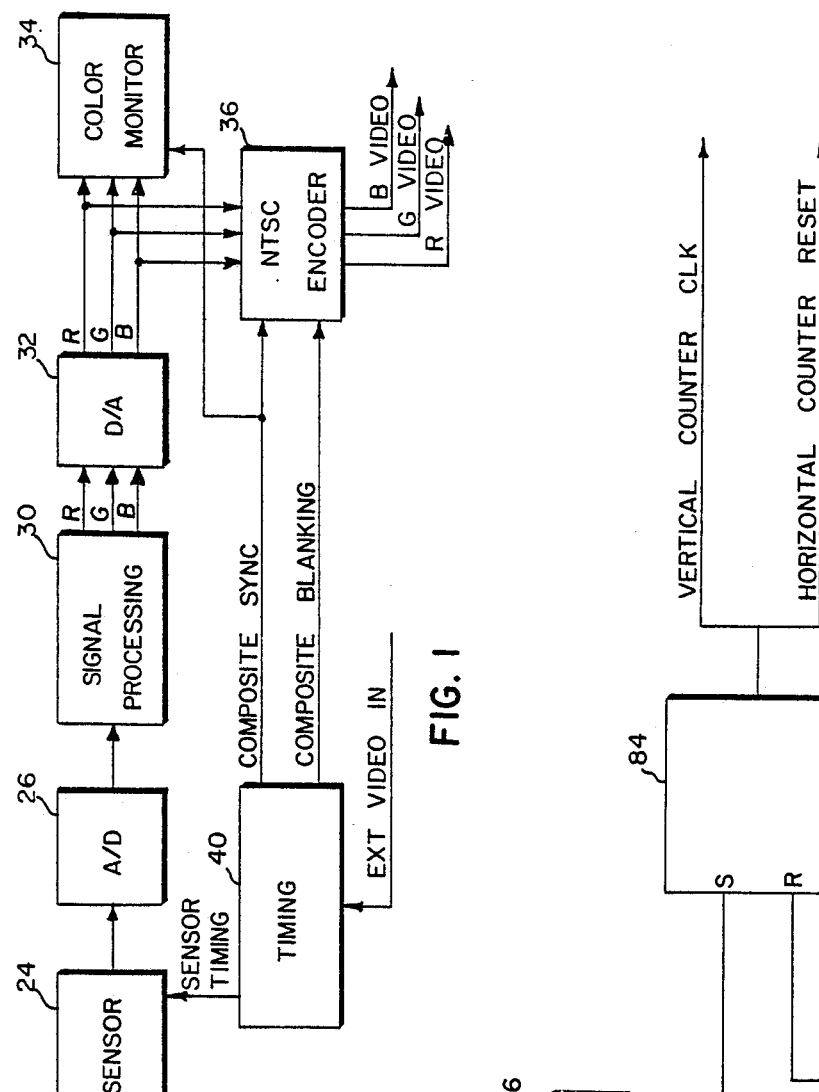
FIG. 1 is an block diagram overview of a video system incorporating a conventional sensor, color monitor, and NTSC encoder, as well as the timing circuit of the present invention.
FIG. 3 is a diagram of a line counting portion of the timing circuit.

Referring first to FIG. 1, there is provided an exemplary video system incorporating the timing circuit of the present invention. In this video system, an image contained on a film plane 20 is illuminated by a light source 22 onto an imaging sensor 24, which in an exemplary embodiment is an interline transfer charge coupled device (CCD). In response to the image projected thereon, the sensor 24 generates electrical image signals which are digitized at an A/D convertor 26 and then fed downstream through signal processing block 30. Although the downstream signal processing block is not part of the present invention, typically it performs such functions as conversion of the image signals to red, green and blue color signals, as well as color correction of these RGB signals.

Proceeding further downstream, digital RGB signals from processor 30 are converted to their analog equivalents by a D/A convertor 32 and then output to a color monitor 34, such as a cathode ray tube, for display of the image. In a further exemplary embodiment, the RGB signals are also tapped off to an encoder 36 for encoding the RGB signals into an NTSC video format for broadcasting. Timing signals for the aforementioned elements are provided by the novel timing circuit 40 of the present invention. In this description, only the timing of the sensor 24, color monitor 34 and NTSC encoder 36 will be discussed.

As mentioned briefly in the Background of the Invention, the image signals output from the sensor 24 are delayed while being processed through the converters 26, 32 and signal processor 30, and prior to reaching the monitor 34 and encoder 36. To compensate for this delay so that the first pixels displayed out of the sensor 24 are synchronized with the first lines displaying picture information of the monitor and NTSC rasters, the image signals are clocked out of the sensor 24 prior to the beginning of the first raster sweep of the monitor by a time interval equal to the signal processing delay. By adjusting the clocking of the image signals out of the sensor 24 relative to the monitor and NTSC rasters, synchronization of the system to an external video source is facilitated. That is, regardless of whether or not the monitor/NTSC video is synchronized to the external signal, the delay between the sensor and monitor/NTSC video remains the same. Therefore there is no need to change the timing of the elements of the system when switching back and forth between internal timing and an external timing reference.

In an exemplary embodiment of the present invention, encoder 36 is a "Color Television RGB to NTSC Encoder", MC1377 manufactured by Motorola Co. This encoder responds to composite sync, composite blanking, as well as red, green and blue inputs to generate a composite video signal for NTSC broadcasting. In addition, the monitor 34 is a conventional television CRT monitor having RBG and composite sync inputs to generate a color video display.

Figure 2:
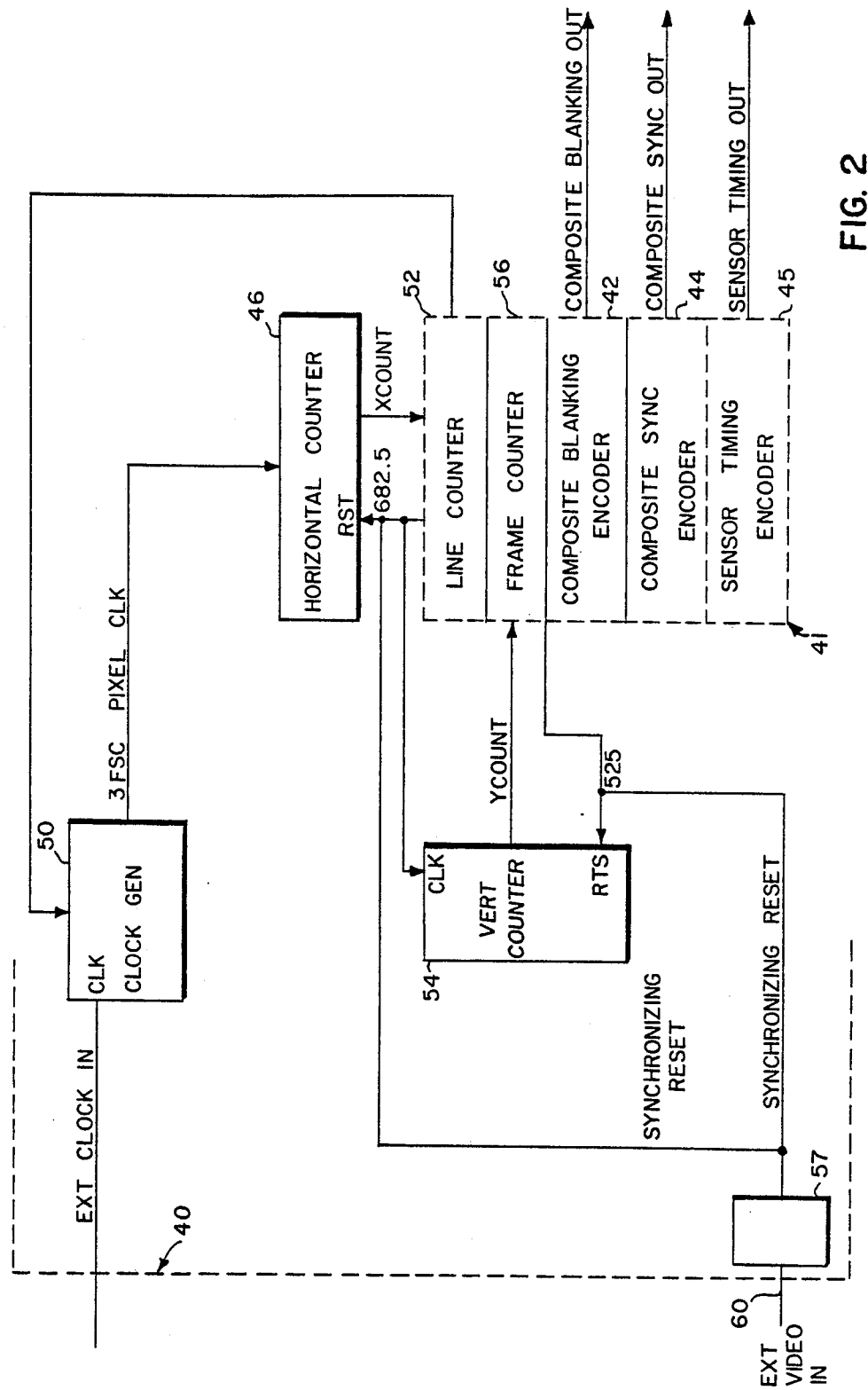
FIG. 2 is a more detailed block diagram of the timing circuit of the present invention.

In order to generate the timing signals for the video system, reference is made to the timing circuit shown in FIG. 2. There is shown an encoding section indicated at 41 which includes a blanking encoder 42 for generating the composite blanking signals, and a composite sync encoder 44 for generating the composite sync signals. Also, a sensor timing encoder 45 is provided for generating signals for timing the sensor 24; with operation of these encoders to be described in further detail later. In addition, there is provided a horizontal counter 46 for counting the pixels occurring in each horizontal line. The counter 46 is clocked by a PIXEL CLOCK signal output (three times the color subcarrier frequency) from a clock generator 50. The horizontal count (XCOUNT) from counter 46 clocks a line counter 52 which generates a signal for resetting the horizontal counter after every 682.5 pixels. This reset signal is also used to clock a vertical counter 54 which generates a vertical count (YCOUNT) output to a frame counter 56. After every 525 lines (vertical counts), the frame counter 56 generates a signal for resetting the vertical counter.

The Motorola NTSC encoder may be clocked at 3.58 Mhz by a conventional crystal oscillator; however, in an exemplary embodiment a 3.58 Mhz signal is provided from the output of the apparatus described in a copending application which is assigned to the assignee of the present invention and which is entitled "Dual Mode Gen-Lock System Which Automatically Locks to Color Burst or to Sync Information" by D. K. McCauley; the contents of which are incorporated herein by reference.

When it is desirable to synchronize the video system to an external video source (not shown), a video signal from this external source is fed to a synchronizing signal generator 57 (FIG. 2) which causes the counters 46, 54 to reset at the proper time to adjust the composite blanking and composite sync signals so that the color monitor and NTSC rasters are synchronized to the raster of the external video signal. This occurs in a manner to be described in further detail later.

Referring now to FIGS. 2 and 3, a vertical counter clock and the horizontal counter reset pulse are generated by multiple input AND gates 80, 82 whose outputs are tied downstream to the set and reset inputs, respectively, of an SR latch 84. When a horizontal count (XCOUNT) equal to 682 (end of line) is reached, the output of AND gate 80 goes active, setting the latch 84. The output from latch 84 clocks the vertical counter 54 (FIG. 2) once, and resets the horizontal counter 46 to begin a new line. Then when XCOUNT=0 is reached, the output from AND gate 82 goes active, and latch 84 is reset. Although not described further herein, the signal for resetting the vertical counter at the end of a frame is generated in a similar manner, except that the latch sets on YCOUNT=525 and resets on YCOUNT=0. These reset pulses are distinct from the synchronizing reset pulse generated by the synchronizing generator 57.

Figure 4A:
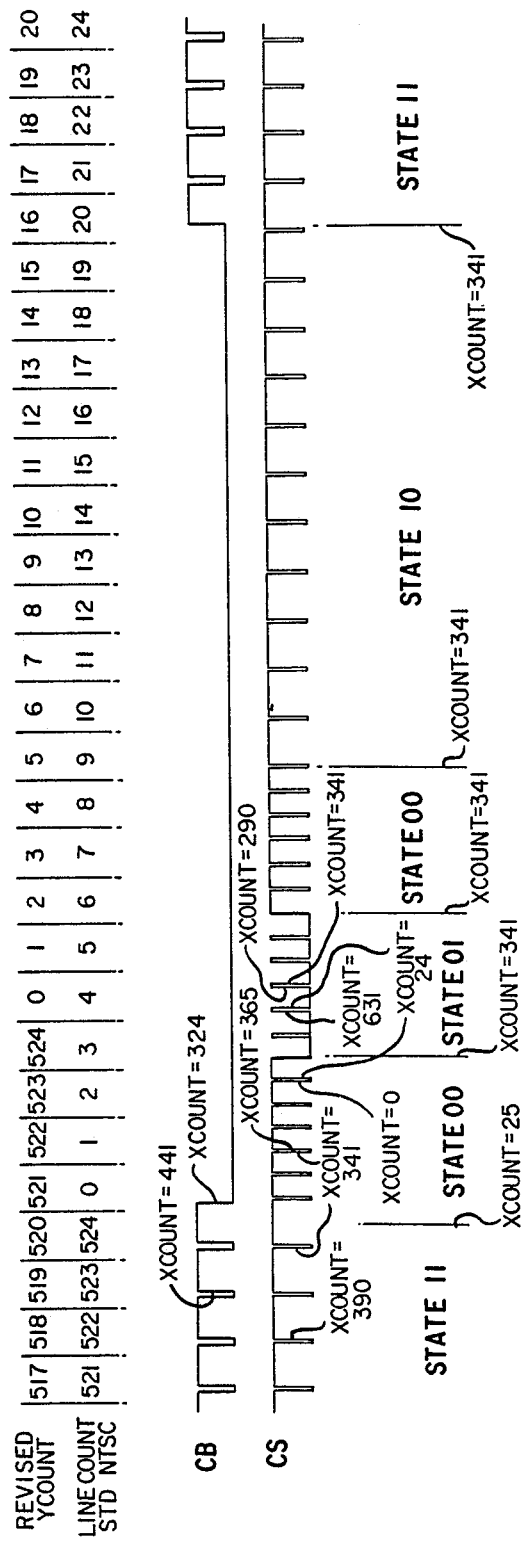
FIGS. 4A and 4B are timing diagrams of composite sync and composite blanking pulses, with FIG. 4A showing the pulses generated during the odd field, and FIG. 4B showing the pulses generated during the even field.
Figure 4B:
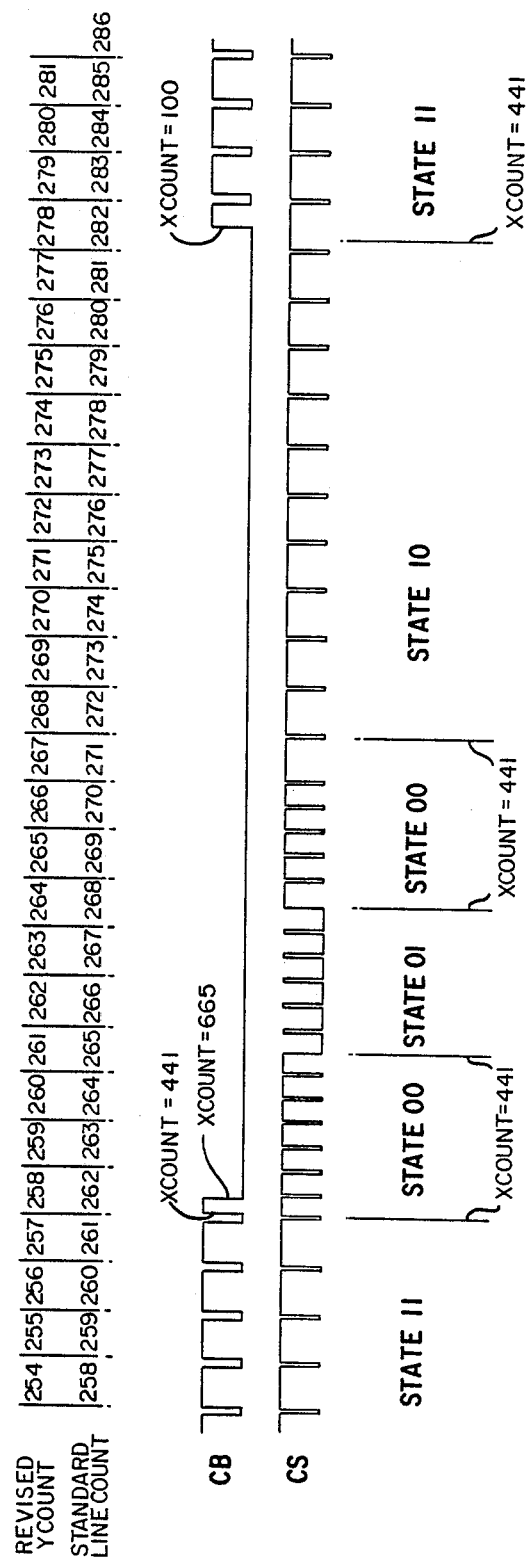

With regard to the generation of the composite sync and composite blanking signals, reference is first made to the timing diagram of FIG. 4A which shows the timebase signals at the beginning of the odd field for NTSC line counts 522 through 25, and FIG. 4B which shows the timebase signals at the beginning of the even field for NTSC line counts 259 through 286. It is apparent from FIGS. 4A and 4B there is a standard NTSC line count as well as a revised line count (to be described later). For the present, all line counts (YCOUNTS) and horizontal counts (XCOUNTS) will refer to the revised line and horizontal counts. Referring first to the composite sync signal in FIG. 4A, this signal includes a horizontal sync portion which is identified by a binary state 11 in FIGS. 4A and 4B, a preequalizing portion identified by state 00, a vertical sync portion (state 01), a post equalizing portion (also state 00), another horizontal sync portion (state 10), and the remainder of the horizontal sync portion (state 11). By examining each of these composite sync pulse groups in detail, it can be seen that for every line (YCOUNT) of states 11 and 10, the horizontal sync pulses are reset (go low) at XCOUNT=341 and set (go high) at XCOUNT=390. Moving on to the pre and post equalizing pulses which are designated by states 00, for every line count these pulses are reset at XCOUNT=341 and set at XCOUNT=365. Additional pulses are formed by resetting at XCOUNT=0 and setting at XCOUNT=24. And now turning to the vertical sync pulses which are designated by state 01, for every line count there is a set at XCOUNT=290 and a reset at XCOUNT=341. Additional pulses are formed by setting at XCOUNT=631 and resetting at XCOUNT=0.

Before describing an exemplary embodiment for generating the aforementioned composite sync signal, a further discussion of the states will be provided. In the present invention the aforementioned binary states are used to identify the various portions of the composite sync signal and to gate the aforementioned XCOUNTs which define the signal. In order to generate the aforementioned states 11, 00, 01, and 10 for identifying the various pulse groups which make up the composite sync signal, reference is made again to the timing diagrams of FIGS. 4A and 4B. During the odd field shown in FIG. 4A, the transition from the horizontal sync pulses (state 11) to the preequalizing pulses (state 00) occurs at YCOUNT=521, revised XCOUNT=25. The transition from the pre-equalizing pulses to the vertical sync pulses (state 00 to state 01) occurs at YCOUNT=524, XCOUNT=341. The next transition from state 01 to state 00 occurs at line count YCOUNT=2, XCOUNT=341; from state 00 to state 10 at YCOUNT=5, XCOUNT=341; from state 10 to state 11 at YCOUNT=16, XCOUNT=341. Now referring to the even field in FIG. 4B, the transition from state 11 to state 00 occurs at YCOUNT=258, XCOUNT=441; from state 00 to state 01 at YCOUNT=261, XCOUNT=441; from state 01 to state 00 at YCOUNT=264, XCOUNT=441; from state 00 to state 10 at YCOUNT=267, XCOUNT=441; and from state 10 to state 11 at YCOUNT=278, XCOUNT=441.

Figure 5B:
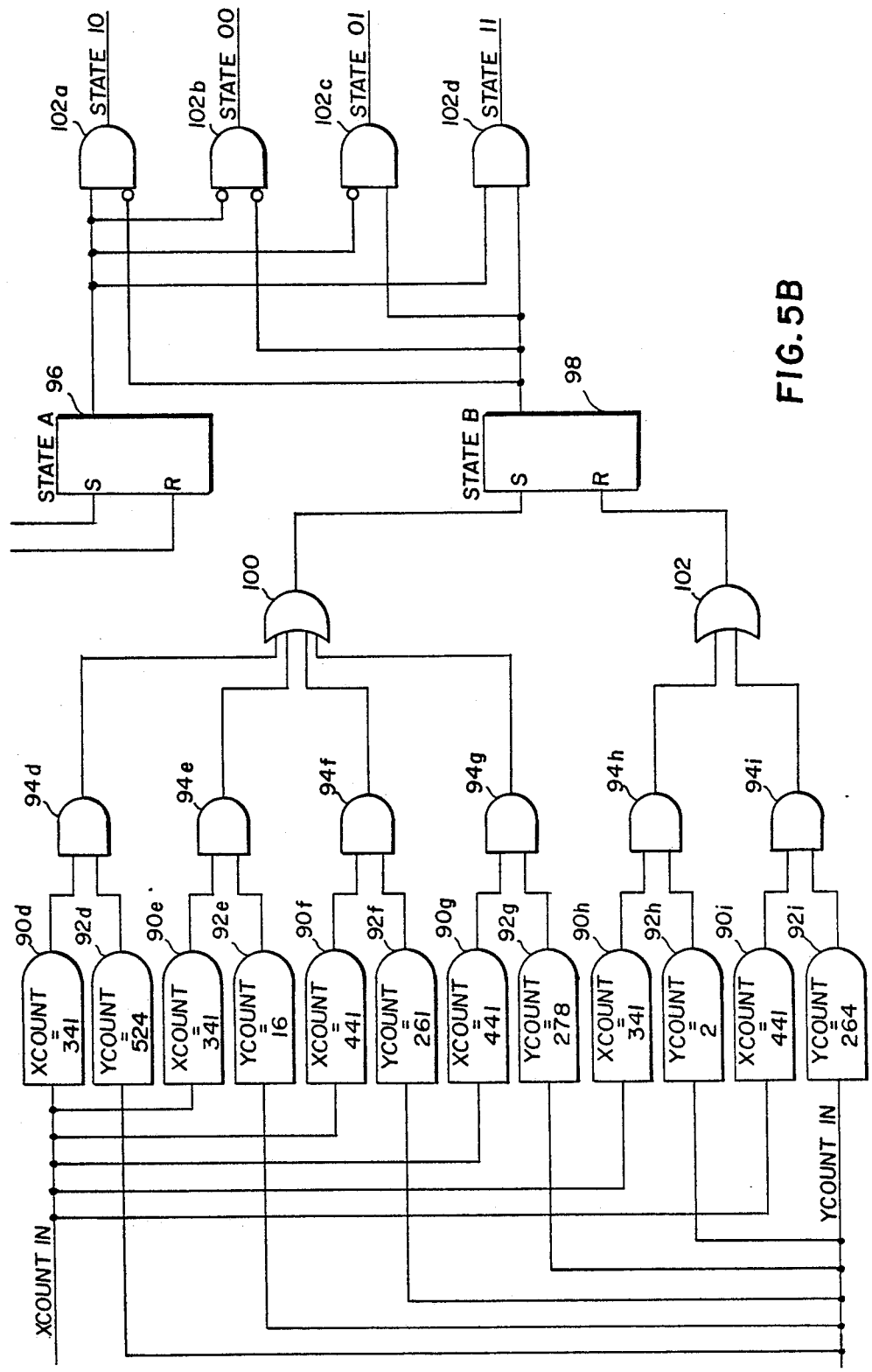

In order to generate the aforementioned binary state designations at the proper XCOUNT AND YCOUNT, reference is made to FIGS. 5A and 5B where there are provided multi-input AND gates 90a through 90i which receive an XCOUNT input from horizontal counter 46. Each of the AND gates 90 is responsive to a distinctive XCOUNT (shown in FIGS. 5A and 5B) to generate an active output. Similarly, there are provided multi-input AND gates 92a through 92i which receive a YCOUNT input from vertical counter 54. Each of these gates 92 is responsive to a distinctive YCOUNT to generate an active output. In order to generate an an active output when an incoming XCOUNT, YCOUNT corresponds to a state transition, e.g. between state 11 and state 00, each pair of AND gates 90, 92 having identical letter suffixes have their inputs tied to the input of a respective downstream AND gate 94.

As shown in FIG. 5A, gate 90a which is responsive only to an XCOUNT of 341, and gate 92a which is responsive only to a YCOUNT of 5, have their outputs tied to the inputs of AND gate 94a, which in turn has its output tied to the set input of an SR latch 96. In this manner latch 96 is set at XCOUNT=341, YCOUNT=5 (identifying the transition from state 00 to state 10 in FIG. 4A). Resetting of the latch 96 occurs as shown in FIG. 5A whenever either transition XCOUNT=441, YCOUNT=258 (state 11 to state 10 in FIG. 4B), or XCOUNT=25, YCOUNT=520 (state 11 to state 00) in FIG. 4A) occurs. In an exemplary embodiment, the logic gates forming timing system 40 are implemented by a custom matrixed gate array such as a Gate Array MTD-5K manufactured by Eastman Kodak Company.

In order to provide additional state transitions, there is also provided an SR latch 98 in FIG. 5B which is set whenever the following XCOUNTS/YCOUNTS occur: XCOUNT=341, YCOUNT=524 (state 00 to state 01 in FIG. 4A); XCOUNT=341, YCOUNT=16 (state 10 to state 11 in FIG. 4A); XCOUNT=441, YCOUNT=261 (state 00 to state 01 in FIG.4B); and XCOUNT=441, YCOUNT=278 (state 10 to state 11 in FIG. 4B). An active output from gates 96d through 96g in response to any one of these XCOUNT/YCOUNTs is fed through a multiple input OR gate 100 which sets the latch 98. Resetting of latch 98 occurs whenever there is an XCOUNT=341, YCOUNT=2 (state 01 to state 00 in FIG. 4A), or XCOUNT=441, YCOUNT=264 (state 01 to state 00 in FIG. 4B). This occurs via the OR gate 102 whose output is tied to the reset input of the latch 98.

Continuing downstream in FIG. 5B, in order for the latch outputs to be decoded so that they identify the aforementioned states, the output of the latch 96 is tied to the inputs of AND gates 102a through 102d; with the remaining inputs of the AND gates 102 being tied to the output of the latch 98. Gate 102a has one inverting and one noninverting input so that it generates an active output only in response to state 10. The remaining gates 102 have inverting and/or noninverting inputs, as the case may be, so that each will signal the presence of only one of the remaining states.

Figure 6:
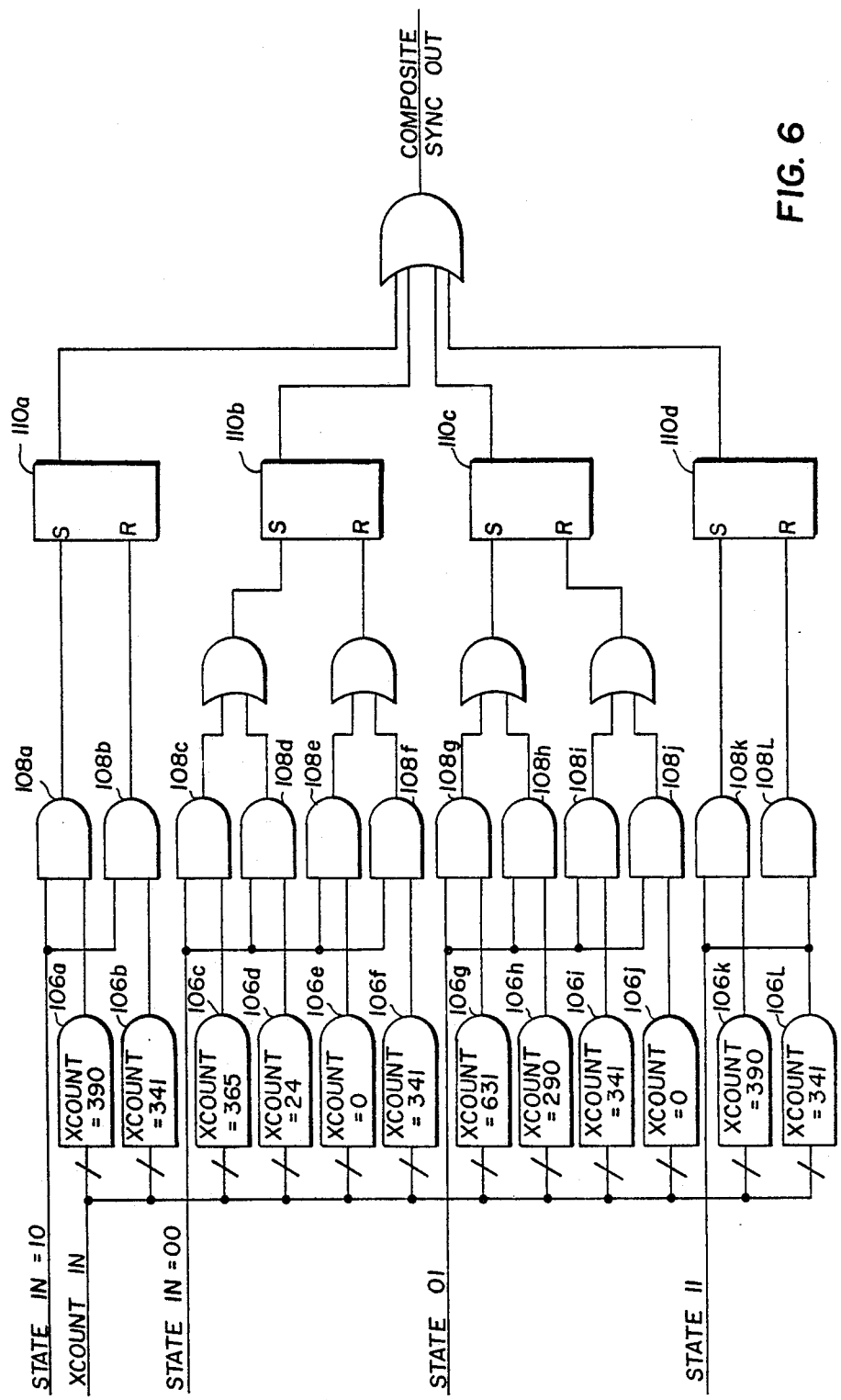
FIG. 6 is a diagram of an exemplary circuit for generating the composite sync signal.

Having the defined the binary transition states by the proper XCOUNT and YCOUNT, these states are used to generate the composite sync signal in a manner that the XCOUNT from horizontal counter 46 is fed to a number of multiple input AND gates 106a through 106l shown in FIG. 6. Each of these AND gates 106 generates an active output in response to a distinctive XCOUNT which corresponds to a pulse transition within a binary state. More specifically, the output from gate 106a which is responsive to XCOUNT=390 and a state 10 signal from gate 102a, are fed to the inputs of a downstream AND gate 108a, which in turn has its output tied to the set input of an SR latch 110a which sets in response to the combination of state 10 and the XCOUNT=390. Furthermore, the output from gate 106b which is responsive to XCOUNT=341 and a state 10 signal, are fed to the inputs of a downstream AND gate 108b whose output is tied to the reset input of the latch 110a for resetting the latch in response to state 10 and XCOUNT=341. In this manner, the pulse train of state 10 in FIG. 4A is generated.

In order to generate the remainder of the composite sync signal shown in FIGS. 4A and 4B, there are provided SR latches 110b through 110d. In response to a combination of state 00 and an XCOUNT =365 or=24, latch 110b is set; whereas in response to state 00 and XCOUNT=0 or=341, latch 110b is reset. Likewise, the latch 110c is set in response to the combination of state 01 and XCOUNT=631 or=290, and reset in response to the combination of state 01 and XCOUNT=341 or=0. And finally, latch 110d is set in response to the combination of state 11 and XCOUNT=390, and reset in response to the combination of state 11 and XCOUNT=341. In this manner the composite sync signal is generated.

With regard to the generation of the composite blanking signal, reference is made to FIGS. 4A and 4B which show that in state 11, composite blanking is set for every line count at XCOUNT=441, and reset at XCOUNT=324. In addition, for every line of state 11, there is a set at XCOUNT=0 to generate the half line in the even field; however this set is apparent only at line count 278 (FIG. 4B). This is due to the fact that there is no set at XCOUNT=441 (YCOUNT=278) because of a change from state 10 to state 11 occurring after XCOUNT=441. In order to generate the half line in the odd field, an additional reset occurs during state 00 at XCOUNT=665, YCOUNT=258 (FIG. 4B). This reset is only apparent during the odd field in state 00 because there is a set at XCOUNT=441, YCOUNT=258, due to a change from state 11 to state 00 occurring after XCOUNT=441.

Having described the form of the composite blanking signal, generation of the composite blanking signal is described with reference to FIG. 7. The sets occurring at XCOUNT=441, =0 are implemented by AND gates 118a and 118b, respectively; whereas the resets at XCOUNT=665, 324 are implemented by AND gates 118c and 118d. To accomplish this, the inputs of gates 118 receive the current XCOUNT from the horizontal counter 46. Furthermore, the outputs from gates 118a and 118b are gated by state 11 through AND gates 120a, 120b, and via a downstream OR gate 122a to set input of a latch 124. On the other hand, the XCOUNT=665 is gated by the state 00 through an AND gate 120c and through a OR gate 122b to the reset input of the latch 124. A reset at every XCOUNT=324 is provided by the the ungated signal from gate 118d, which is fed to the latch reset via the OR gate 122b. In this manner, the composite blanking signal shown in FIGS. 4A and 4B is generated.

Having described the generation of the composite sync and blanking signal, attention now will be turned to the timing of these signals when an external video source is referenced. In the present invention, upon receipt of an external video signal, counters 46, 54 (FIG. 2) are reset to zero. This is accomplished by the synchronizing signal generator 57, shown in greater detail in FIG. 8, which provides an output pulse when the middle is reached of the fourth line of the odd field of the external video signal. The synchronizing signal generator 57 includes a sync stripper 120, such as an LM 1881 Video Sync Separator manufactured by National Semiconductor, for receiving the video signal, and in response thereto, for generating a vertical sync signal (VRT) and a field signal (FLD). In operation, the field signal is high during the presence of an odd video field, and the vertical sync signal is high when receiving the vertical sync portion of the external video signal; with the vertical sync going high at the middle of the fourth horizontal line of each field. To achieve synchronization, the FLD and VRT outputs are fed to the inputs of an AND gate 124 whose output is inverted by the inverter 125 and is latched by the downstream latch 128. The latch 128 has its active low set input and its D input both tied high, and its active low input tied through a feedback loop containing a feedback resistor 130 to its active low reset input; the reset input being tied to ground via a capacitor 132 which provides an RC time constant of about 500 nanoseconds. In this manner, the rising edge output of the inverter 125 clocks the latch 128 thereby generating a low output pulse of relatively short duration due to the fact that the active low output is fed through the reset feedback loop. This output pulse resets the counters 46, 54 (FIG. 2) to zero.

In order for the timing of the NTSC video and monitor to be synchronized to the external video signal, the revised line counts discussed previously with reference to FIGS. 4A and 4B are used. There is shown at the top of FIGS. 4A and 4B the standard NTSC line counts as well as the revised line counts which have been referenced when providing XCOUNT and YCOUNT information. In this invention, the revised line counts occur four and one half lines earlier than the standard NTSC line counts. Therefore, when the counters 46, 54 are first reset to zero in response to the external video signal occurring at the middle of the fourth line, the composite blanking and composite sync signals are synchronized to the external video. In this manner, the first lines of the color monitor raster and NTSC raster coincide with the first line of the external video raster.

Figure 9:
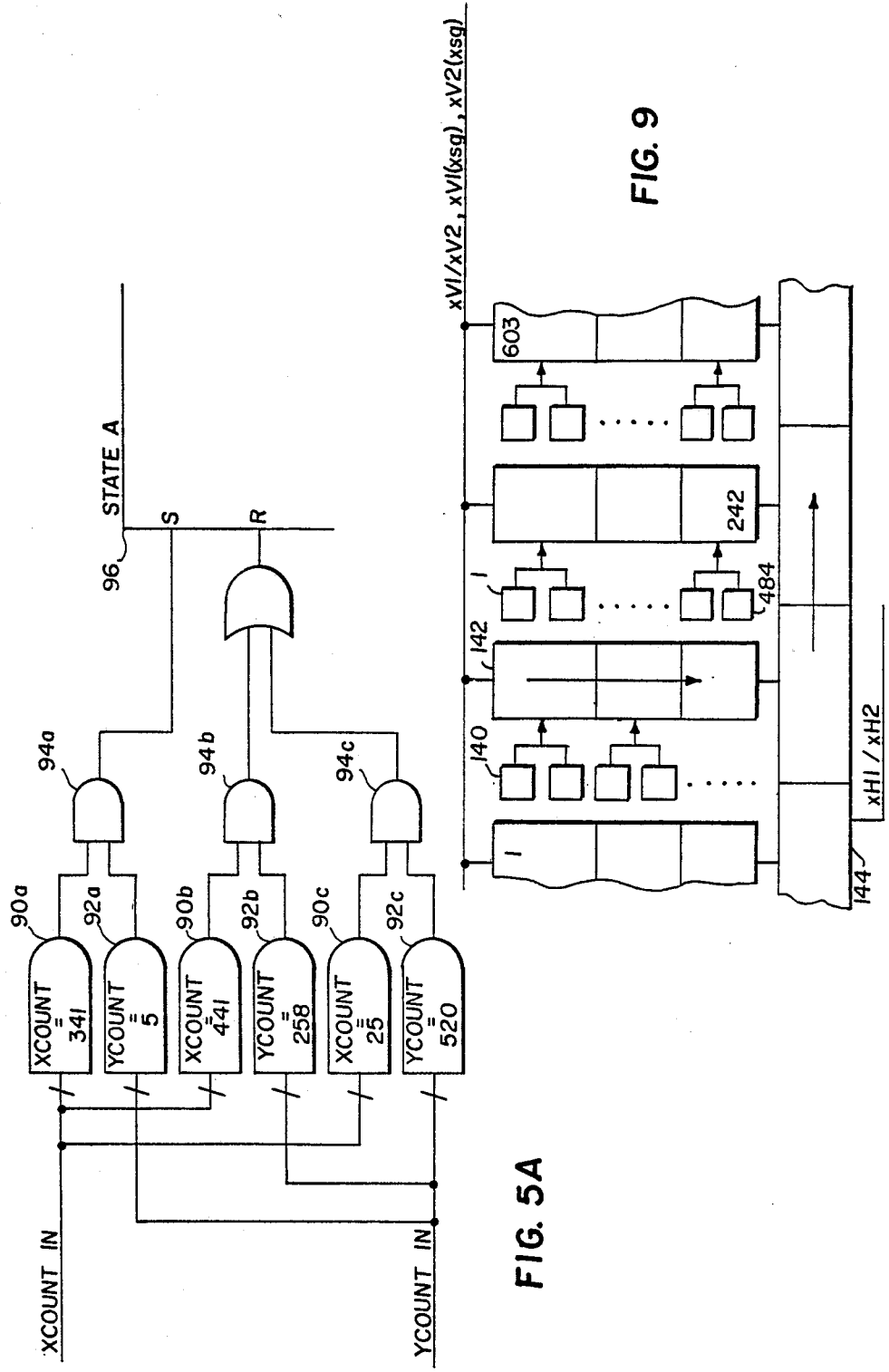
FIG. 9 is a simplified block diagram of an interline transfer charge coupled device imaging sensor.

Having described synchronization of the color monitor and NTSC timing to the external video signal, attention now will be turning to synchronizing the sensor output to the monitor and NTSC video. In an exemplary embodiment, the sensor 24 (FIG. 1) is an interline transfer charge coupled device such as a 570(H)×484(V) Element Interline CCD Imager, KAI-0280, which is mounted on a hybrid carrier, and which is manufactured by Eastman Kodak Company. A brief description of the operation of this CCD is provided by referring to FIG. 9. Data representing pixels from photodiode sites 140, and which is located in vertical shift registers 142, is clocked downward into horizontal shift register 144 by complementary clock pulses xV1/xV2, with the odd field being dumped from the photodiodes to the vertical shift registers by holding xV1 at a low level, and xV2 at a higher transfer level. Once the charge carriers have been transferred to the vertical registers, they are shifted to the horizontal register by clocking the vertical register to alternate low states and high states. The charge carriers are then clocked out of horizontal shift register 144 to the downstream A/D convertor 26 (FIG. 1) by complementary clock pulses xH1/xH2. Dumping of the pixel data into the vertical registers 142 is accomplished by driving the vertical clock pulses to transfer levels designated xV1(xsg) or xV2(xsg). This may be explained in further detail by referring to the timing diagram in FIG. 10. Transfer clock xV2(xsg) transfers pixel data into the vertical shift registers at a compensated YCOUNT=524, with the clocking of the vertical shift registers beginning at a compensated YCOUNT=14 (dark pixels), and valid pixel data being clocked out beginning at compensated YCOUNT=18 and ending at compensated YCOUNT=255, whereupon vertical retrace occurs. At the end of vertical retrace, clocking out of dark pixels begins again at compensated YCOUNT=508, with valid pixel data clocked out beginning at compensated YCOUNT=510. The legend at the top of FIG. 10 containing both compensated and uncompensated YCOUNTS will be explained shortly.

Figure 10:
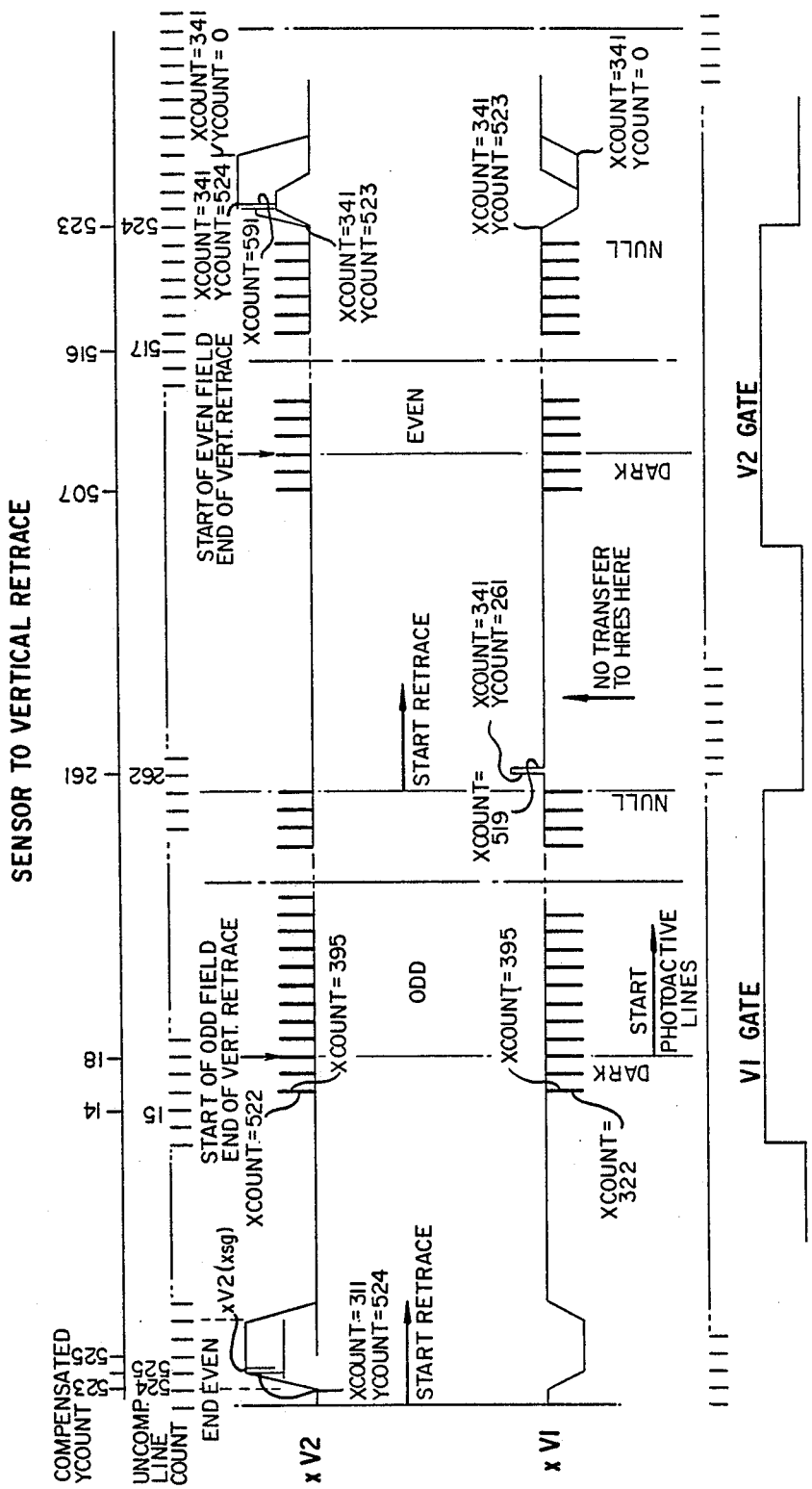
FIG. 10 is a timing diagram for transferring charge carriers from photodiodes of the CCD to vertical registers of the CCD.

More specifically as shown in FIG. 10, transfer clock xV2 is set at XCOUNT=322, and reset at XCOUNT=395; while transfer clock xV1 is reset at XCOUNT=322 and set at XCOUNT=395. This occurs only during the aforementioned active YCOUNTS =12 through 260, and during YCOUNTS 505 through 523 in response to signals V1GATE and V2GATE shown in FIG. 10

The transfer clock xV2 also includes a set at XCOUNT=341, YCOUNT=523, and a reset at XCOUNT =341, YCOUNT=0. During this expanded pulse, a third level (field transfer) pulse is generated, i.e. xV2(xsg), for dumping the charge carriers into the vertical shift register; this pulse being set at XCOUNT=341, YCOUNT=524, and reset at the following XCOUNT=519. On the other hand, transfer clock xV1 provides a complementary pulse which is reset at XCOUNT=341, YCOUNT=523, and set at XCOUNT=341, YCOUNT=0. However, the field transfer pulse xV1(xsg) is set at XCOUNT=341, YCOUNT=261, and reset at the following XCOUNT=519.

Clocking of the pixel data from the vertical shift registers into the horizontal shift registers (between XCOUNT=420 and XCOUNT=341) is gated by a signal HGATE (to be described in further detail later) so that the transfer occurs subsequent to the transfer of the pixel data into the vertical shift registers.

Figure 11:
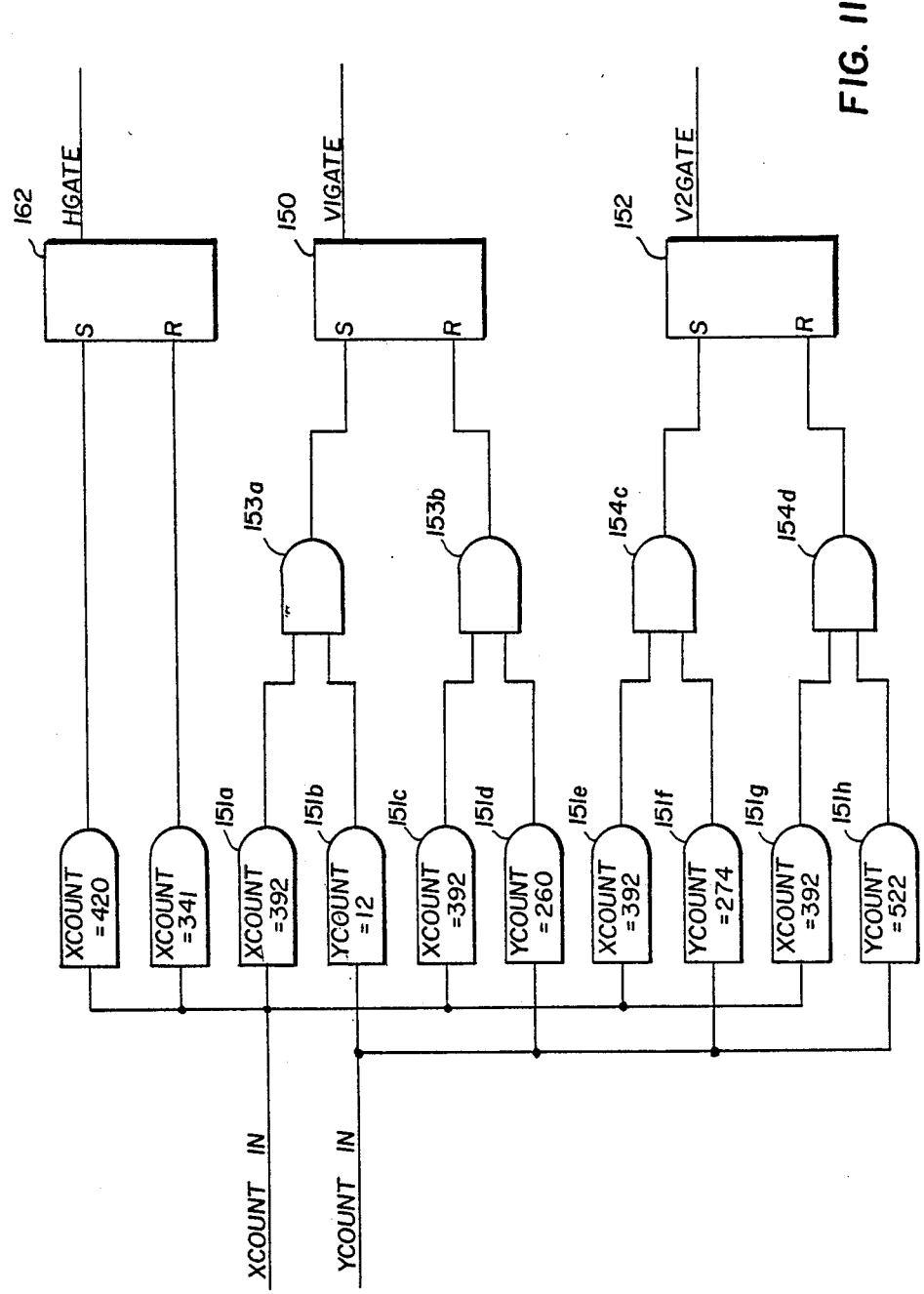
FIG. 11 is a diagram of an exemplary circuit for generating gating signals V1GATE, V2GATE, and HGATE.

Generation of the VGATE and HGATE signals is explained further with reference to FIG. 11. An output V1GATE shown in FIG. 10 is generated from a latch 150 (FIG. 11) which sets, in response to an XCOUNT=392, YCOUNT=12, by means of AND gates 151a, 151b, and 153a; and which resets in response to an XCOUNT=392 and a YCOUNT=260 by means of AND gates 151c, 151d, and 153b. Similarly, an output V2GATE also shown in FIG. 10 is generated by a latch 152 (FIG. 11) which sets in response to an XCOUNT=392, YCOUNT=274 by means of gates 151e, 151f, 153c, and which resets, in response to XCOUNT=392, YCOUNT=522, by means of gates 151g, 151h and 153d.

Figure 12:
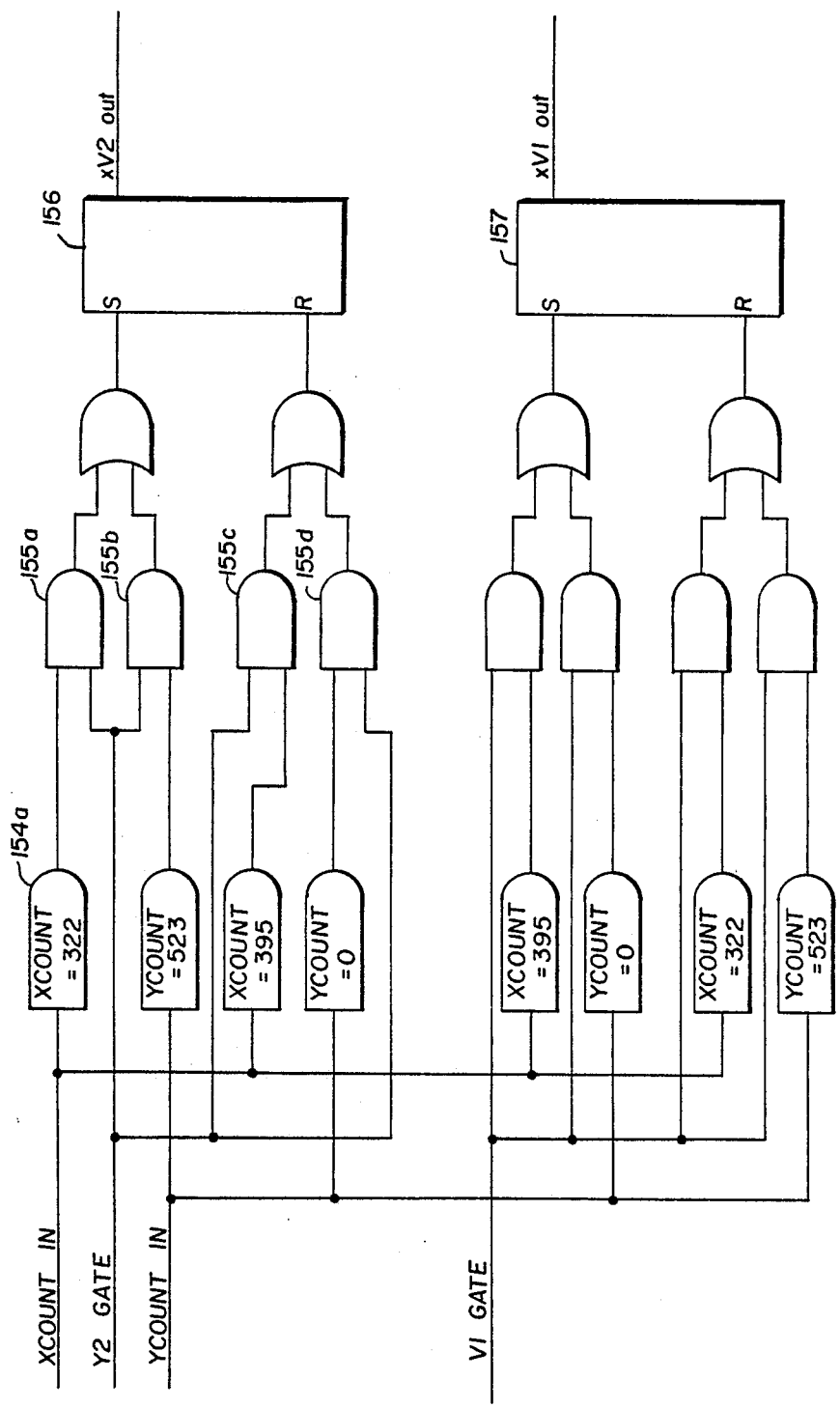
FIG. 12 is a diagram of an exemplary circuit for generating signals xV1 and xV2 for clocking vertical registers of the sensor.

As shown in FIG. 12, V2GATE is ANDed at a gate 155a with the output of an AND gate 154a whose output is active only upon receipt of XCOUNT=322. This ANDed output is fed to the set input of a latch 156 to generate xV2 at its output. As shown in FIG. 12, a YCOUNT=523 also sets latch 156 when it is ANDed with V2GATE at gate 155b. Similarly, V2GATE is ANDed with XCOUNT=395 at gate 155c to reset the latch 156 at the conclusion of the gated interval. A YCOUNT=0 also resets latch 156 when ANDed with V2GATE at the gate 155d.

In a similar manner, V1GATE is used to gate XCOUNT=395 and YCOUNT=0 for setting a latch 157 in FIG. 12, as well as to gate XCOUNT=322 and YCOUNT=523 to reset latch 157 in order to generate the transfer pulse xV1 which is complementary to xV2.

Figure 13:
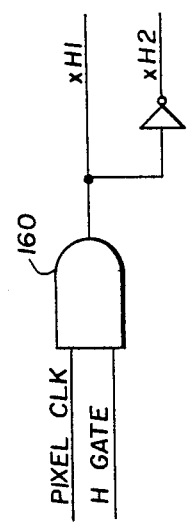
FIG. 13 is a diagram of an exemplary circuit for generating signals xH1 and xH2 for clocking a horizontal register of the sensor.

In addition, the horizontal shift register clocking pulses xH1/xH2 are generated by gating PIXEL CLOCK (FIG. 2) by means of signal HGATE through an AND gate 160 as shown in FIG. 13. The input HGATE is generated by means of a latch 162 (shown in FIG. 11) which is set at XCOUNT=420 and reset at XCOUNT=341.

Figure 14:
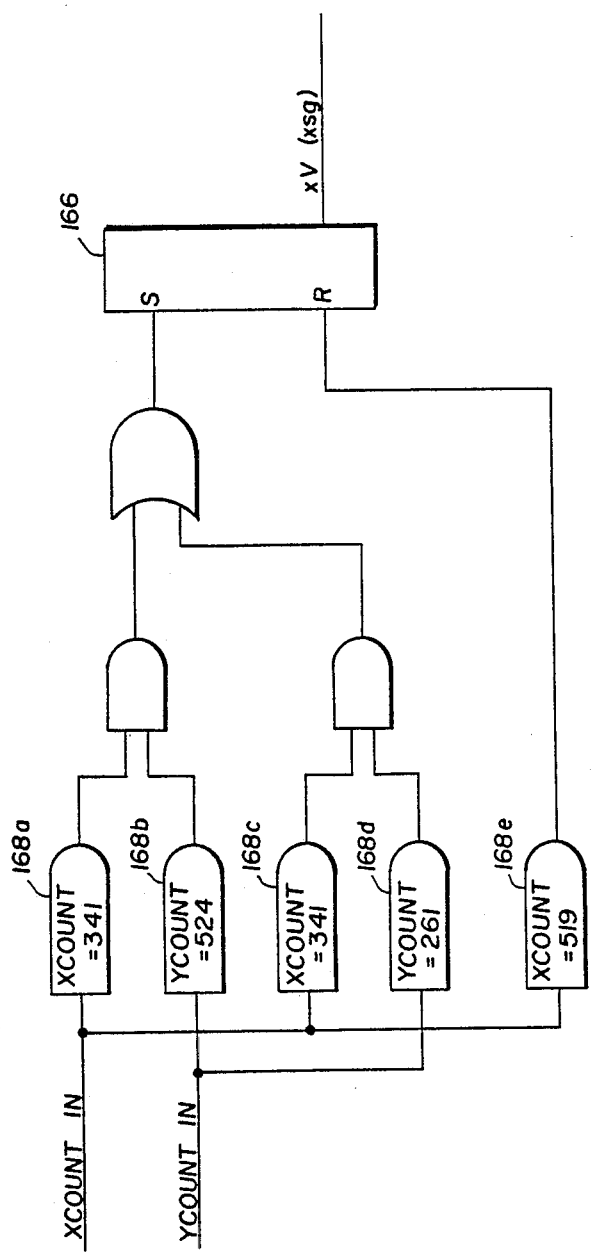
FIG. 14 is a diagram of an exemplary circuit for generating signals xV(xsg) for transferring charge carriers from the phototdiodes into the vertical registers of the sensor.

And finally, generation of the field transfer pulses xV1(xsg), xV2(xsg) is accomplished by means of a latch 166 shown in FIG. 14 which is set at XCOUNT=341, YCOUNT=524, as well as at XCOUNT=341, YCOUNT=261, by AND gates 168a through 168d, and which is reset at the following XCOUNT=519 via AND gate 168e.

The above description of the clocking of sensor 24 utilized compensated XCOUNT and YCOUNT values. These compensated values are obtained by measuring the actual delay which occurs during the intermediate signal processing in blocks 26, 28 and 30 of FIG. 1. It can be appreciated that the actual delay time is a function of the intermediate signal processing; however in an exemplary embodiment this delay is determined to be equivalent to a delay of one line (YCOUNT=1) plus 22 pixels (XCOUNT=22). Delay compensation is achieved by adjusting V1GATE and V2GATE in FIG. 11 so that (i) every YCOUNT at AND gates 151b, 151d, 151f, and 151h occurs one YCOUNT sooner than the uncompensated linecount value (FIG. 10) which is based on a zero intermediate signal processing delay; and (ii) every XCOUNT at AND gates 151a, 151c, 151e, and 151g occurs 22 horizontal counts earlier than the uncompensated horizontal counts. In other words, the pixel data from the sensor 24 is clocked out one line and 22 pixels ahead of the monitor and NTSC video rasters. This same one line and 22 pixel correction is made to the XCOUNTS and YCOUNTS for generating xV1 and xV2 in FIG. 12, and for generating xV(xsg) in FIG. 14.

In summary, the sensor timing is adjusted relative to the video monitor and NTSC timing to compensate for the signal processing delay therebetween. In response to an external synchronizing signal, signals XCOUNT, YCOUNT to the sensor timing encoder 45 (FIG. 2), composite sync encoder 44, and composite blanking encoder 42 are reset to synchronize these elements to the external video source as well as to maintain the required delay compensation.

What is claimed is:

1. A method for generating a video signal, the method comprising the steps of:
  a. outputting a first signal which begins with information representing a first element of an image at a first time;
  b. receiving the first signal at a time which is later than the first time by a first time differential, and generating an internal video signal, in response to the first signal, for displaying the image by a raster;
  c. adjusting the internal video signal to begin the raster at a second time in response to receipt of an external synchronizing signal, and at a third time in response to nonreceipt of the external synchronizing signal; and
  d. outputting the first element ahead of the raster by a time which is equal to the time differential, so that the raster begins with the first element of the image when the raster starts at the second time and at the third time.

2. The method as set forth in claim 1 wherein:
  a. the time differential is referenced relative to the raster during receipt and nonreceipt of the external synchronizing signal so that the first element of the image is located at the beginning of the raster at the second time and at the third time;
  b. the second time and the third time are different times.

3. The method as set forth in claim 2 additionally including the steps of:
  a. receiving the external synchronizing signal in the form of an external video signal, and generating a timing signal which is indicative of a raster position of the external video signal; and
  b. adjusting the internal video signal in response to the timing signal, so that the raster position of the internal video signal is synchronized with the raster position of the external video signal.

4. The method as set forth in claim 3 wherein the internal video signal is adjusted in a manner that the position of the raster in the internal video signal corresponds to the position of the raster in the external video signal.

5. The method as set forth in claim 1 wherein:
a. the internal video signal is referenced by a vertical position and a horizontal position of an x,y matrix;
b. the first signal is referenced by a vertical position and a horizontal position of the x,y matrix;
c. The time differential between the output of the first signal and the position of the raster corresponds to a horizontal position differential $\Delta x$ and a vertical position differential $\Delta y$ between the first signal and the internal video signal; and
d. the horizontal position and vertical position which reference the first signal are adjusted, relative to the horizontal and vertical positions which reference the internal video signal, as a function of the horizontal position differential and vertical position differential of the time differential so that the first element of the image is located at the beginning of the raster at the second and third times.

6. The method as set forth in claim 5 wherein the timing differential is constant so that the same horizontal position differential and vertical position differential is used during receipt and nonreceipt of the external synchronizing signal.

7. Apparatus for generating a video signal, the apparatus comprising:
a. means, responsive to an image, for outputting at a first time a first signal which begins with data representing a first element of an image;
b. means for receiving the first signal at a time which is later than the first time by a first time differential, and for generating an internal video signal for displaying the image by a raster;
c. timing means including
(1) first means for adjusting the internal video signal generating means so that the internal video signal begins the raster at a second time in response to receipt of an external synchronizing signal, and at a third time in response to nonreceipt of the external synchronizing signal.
(2) second means for adjusting the first signal outputting means in a manner to begin outputting the first element ahead of the raster by a time which is equal to the time differential, so that the raster begins with the first element of the image when the raster starts at the second time and at the third time.

8. The apparatus as set forth in claim 7 wherein the timing means includes
a. means for receiving the external video signal and for generating a timing signal which is indicative of a raster position of the external video signal; and
b. means, responsive to the timing signal, for adjusting the internal video signal generating means so that so that the raster position of the internal video signal is synchronized with the raster position of the external video signal.

* * * * *